Figure 7:
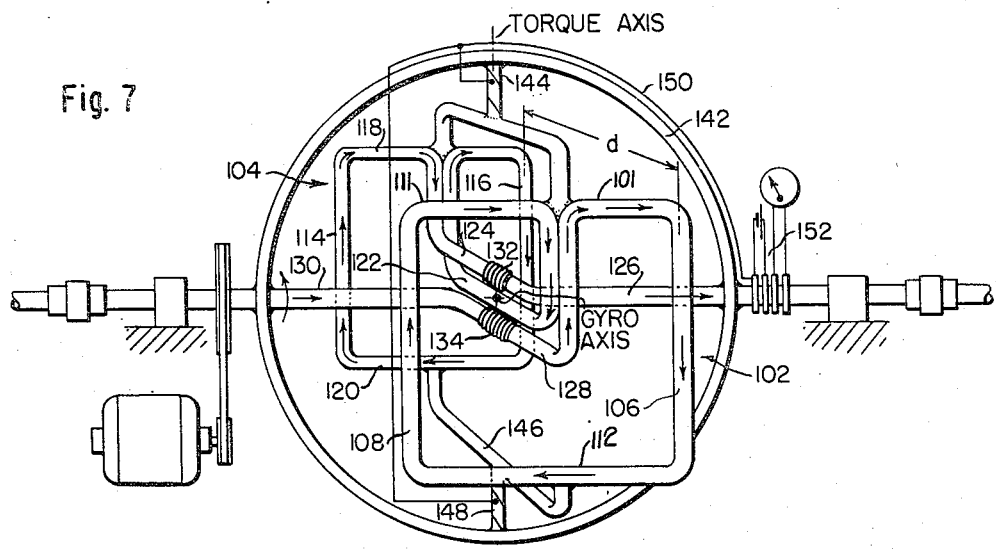

April 22, 1958 M. D. ALTFILLISCH ET AL 2,831,349
SQUARE GYROSCOPIC FLOWMETER
Filed Sept. 7, 1954 3 Sheets-Sheet 1
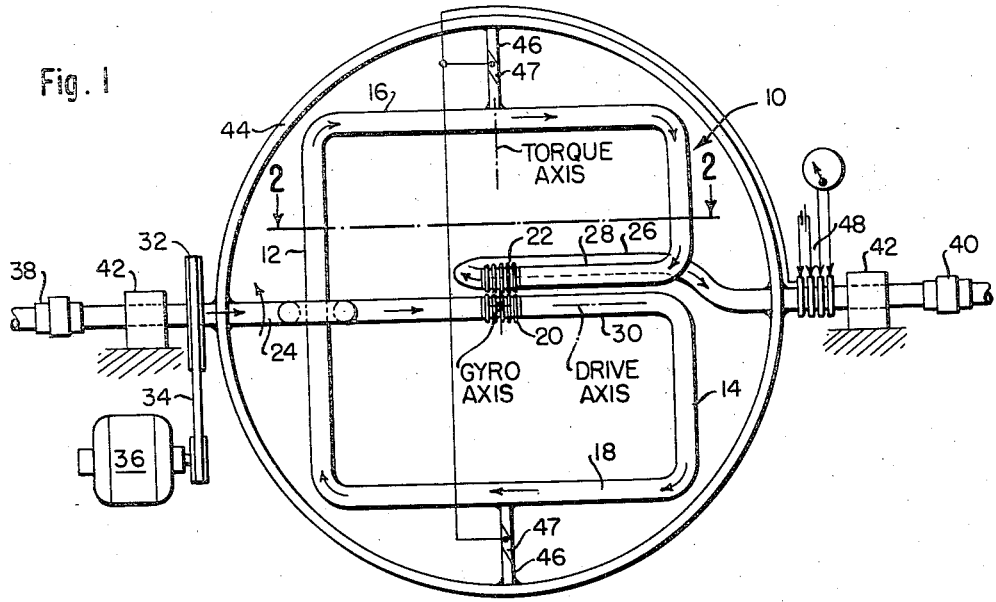
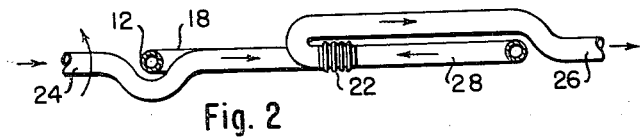
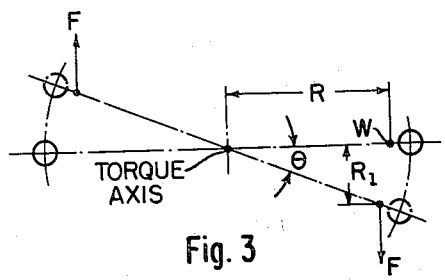
INVENTORS
MICHAEL D. ALTFILLISCH
GEORGE S. CHERNIAK
HOWARD A. POWERS
ROBY B. WHITE
BY
ATTORNEYS

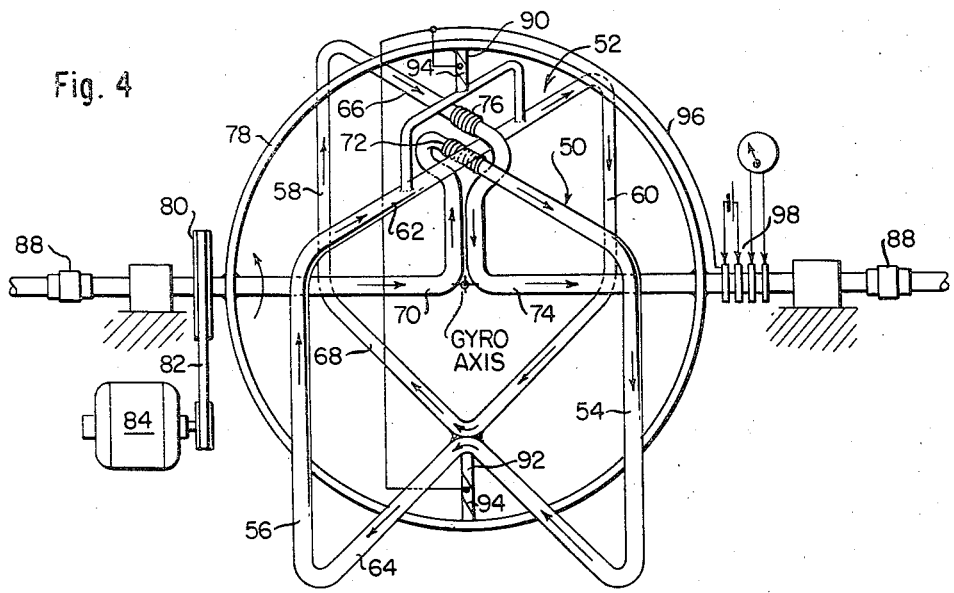

April 22, 1958  M. D. ALTFILLISCH ET AL  2,831,349
SQUARE GYROSCOPIC FLOWMETER
Filed Sept. 7, 1954  3 Sheets-Sheet 3

INVENTORS
MICHAEL D. ALTFILLISCH
GEORGE S. CHERNIAK
HOWARD A. POWERS
ROBY B. WHITE
BY
Kenway, Jenney, Witter & Hildreth
ATTORNEYS

United States Patent Office 2,831,349
Patented Apr. 22, 1958

2,831,349

SQUARE GYROSCOPIC FLOWMETER

Michael D. Altfillisch, Canton, George S. Cherniak, Newton, Howard A. Powers, Medfield, and Roby B. White, Sharon, Mass., assignors, by mesne assignments, to American Radiator & Standard Sanitary Corporation, New York, N. Y., a corporation of Delaware Application September 7, 1954, Serial No. 454,487

9 Claims. (Cl. 73—194)

This invention relates to mass flowmeters, and more particularly is an improvement of the gyroscopic flowmeter disclosed in copending application Ser. No. 380,-414 filed September 16, 1953 in the name of William A. Jones and George S. Cherniak, and now abandoned.

It has been clearly demonstrated in the above-named application that in a circular flowmeter employing gyroscopic principles, the gyroscopic couple exerted about an axis perpendicular to the precession and gyroscopic spin axes is equal to $2\pi R^2 rW$, where R is the radius of the coil, $r$ is the precessional velocity in radians/second and W is the mass flow rate in slugs/sec. Therefore, by maintaining R and $r$ constant, mass flow rate may be determined by measuring the gyroscopic couple. In theory, the flow is confined to the center line of a spinning tube so that the radius of the effective mass from the spin axis is considered constant. Obviously such a flowmeter cannot be built, for it is necessary to employ tubes of finite diameters to carry the fluid to be measured. Frequently the tube employed is of a diameter equal to one tenth or more of the total diameter of the spinning mass. The errors introduced by this practice became apparent when the mass flow rate of a heterogeneous fluid was measured.

The centrifugal force created by the rotation of the coil about the drive or precession axis and the curved path for the fluid defined by the coil cause the heavier particles in the fluid to gather against the walls of the tube disposed away from the drive axis and displace the lighter fluid particles causing them to congregate against the wall nearer the precession axis. With certain mixtures of fluids, the effective radius was found to vary an amount equal to three-fourths or more of the radius of the tube. It is apparent therefore that the employment of circular conduits in gyroscope flowmeters renders the device sensitive to heterogeneous fluids. To eliminate the mixture sensitivity of the gyroscopic flowmeter, it is necessary to stabilize the effective radius of the rotating mass. The magnitude of the errors that may be introduced by variations in the effective radius R becomes apparent when it is recalled that the R factor is squared in the operative equation.

The primary object of this invention, therefore, is to provide a flowmeter capable of measuring mass flow accurate to a fraction of one percent, regardless of whether the fluid to be measured is heterogeneous or homogeneous.

More specifically stated, one important object of this invention is to provide a mass flowmeter employing gyroscopic principles and having a fixed effective radius for fluids of all densities and mixtures. Only by keeping this radius constant is it possible to provide a flowmeter which has a linear output torque with respect to mass flow rate and, at the same time, is non-sensitive to variations that may be encountered in the flow of heterogeneous mixtures or emulsions.

Another object of this invention is to provide a flowmeter non-sensitive to density changes in the fluid flowing through the sensing coil.

This invention reveals that a gyroscopic flowmeter of rectangular configuration is relatively unaffected by wide variations of heterogeneity. Mixtures flowing therethrough have little tendency to separate except at the corners, and the turbulence created at these points substantially compensates for that progression.

This invention also reveals that in gyroscopic flowmeters, there is an optimum configuration. A primary requirement for gyroscopic flowmeters is that the moment of inertia of the entire sensing element, including the tube, the brackets, the material that is flowing and the measuring elements, in other words, the entire mass, must be balanced. This fact may be expressed by a mathematical expression as follows: The inertia of the mass about the plane formed by the torque axis and the gyroscopic spin axis must be equal to the inertia of the mass about the plane formed by the torque axis and the drive or precession axis to obtain a near perfect flowmeter. Another requirement must also be satisfied, namely, that the centrifugal components of the entire sensing element mass must be perfectly balanced about the plane of the gyroscopic spin axis and the drive axis. The fulfillment of these requirements provides a centrifugal balance which for reasons which will become obvious later, greatly enhances the accuracy of the device.

Figure 8:
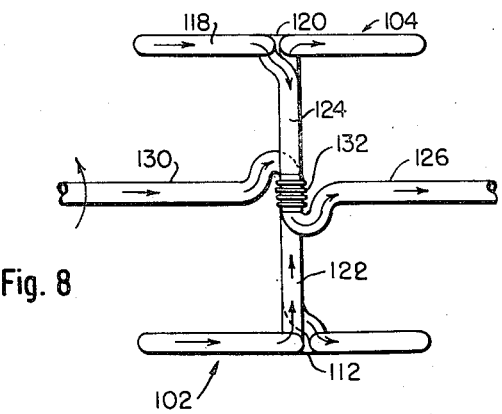

The mathematical requirements set forth above will manifest themselves in the various features of the invention and will be better understood and appreciated from the following detailed description of a number of embodiments thereof selected for purposes of illustration and shown in the accompanying drawings, in which:

Fig. 1 is a view in front elevation of a flowmeter constructed in accordance with this invention, Fig. 2 is a view in section of a portion of the flowmeter illustrated in Fig. 1, Fig. 3 is a vector diagram of the centrifugal forces created by rotation of the sensing coils of Figs. 1 and 2, Fig. 4 is a view in perspective of another embodiment of a flowmeter constructed in accordance with this invention, Fig. 5 is a plan view of a portion of the flowmeter illustrated in Fig. 4, Fig. 6 is a vector diagram of the centrifugal forces created by rotation of the sensing coils of Figs. 4 and 5, Fig. 7 is a view in perspective of still another embodiment of a flowmeter constructed in accordance with this invention, and Fig. 8 is a plan view of a portion of the flowmeter illustrated in Fig. 7.

Proceeding now to a detailed description of the embodiment of this invention illustrated in Figs. 1 and 2, a square loop or coil of tubing 10 is seen to be oriented in a plane formed by the torque and the drive axes. The vertical legs 12 and 14 of the coil are spaced equidistant from and parallel to the torque axis while the horizontal arms 16 and 18 interconnecting the vertical legs at their terminal portions are spaced parallel to the drive axis. An inlet tube 24 adapted to be connected in the line of a fluid to be measured by its coupling 38 passes through the center of the coil, and communicates with a bellows 20. A length of tubing 30 serves as a continuation of the inlet 24 and completes the path for fluid to be measured from the fluid line to the coil proper, while a return conduit 28 communicates with an outlet tube 26 through a second bellows 22. A coupling 40 mounted on the end of the outlet 26 provides a means for returning the fluid measured to the line.

It is important to note that the bellows 20 and 22 which permit a twisting of the coil, pass through the torque axis, and that the twisting of the loop under the influence of its precession about the drive axis and the spin of the fluid within the loop about the gyroscopic spin axis will not appreciably upset the basic balance of the meter.

The full significance of displacement as it affects the accuracy of the meter will now be explained in detail. As was stated in the introductory paragraphs in this specification, to obtain measurements of mass flow rate, the total torque exerted about the torque axis is measured. However, that torque is equal to the sum of the gyroscopic torque and the centrifugal torque about that axis. Because it is only possible to measure directly the total torque, it becomes apparent that the centrifugal torque must be either eliminated or kept to a minimum if accuracy of the mass flow measurement is to be obtained. The effect of displacement of the coil upon the centrifugal torque may best be illustrated by the following mathematical analysis with reference to Fig. 3.

Total $T = T$ gyroscopic $+ T$ centrifugal $T$ centrifugal $= 2FR$, where $F$ is the centrifugal force exerted by one half the coil mass $W$ and its contents about the torque axis in response to its rotation about the drive axis and $R$ is the effective radius of the mass about said torque axis.

$F = MR_1 r^2$ when $R_1$ is the displacement of the center of mass from the drive axis, $r$ is the precessional velocity of the mass about the drive axis, and $M$ is one half the total mass of the sensing loop and its contents.

$R_1 = R\theta$ where $\theta$ is the angular displacement of the sensing loop under the influence of the gyroscopic couple.

Therefore, $F = MR\theta r^2$ and $T$ centrifugal $= 2MR^2 \theta r^2$

It becomes apparent that if the angle of deflection of the sensing loop is maintained at a minimum the centrifugal torque exerted about the torque axis will be negligible. In effect under such conditions total $T = T$ gyroscopic.

By limiting $\theta$ to very small deflections the centrifugal balance required to eliminate density sensitivity is achieved and one important object of this invention is observed to have been accomplished.

Proceeding now to a description of the flowmeter's operation, a motor 36 is provided to drive the loop 10 by means of a pulley 32 mounted on the inlet conduit 24 and an interconnecting drive belt 34. If the motor 36 is of the constant speed type and drives the loop 10 at a predetermined constant angular velocity, the torque produced by the gyroscopic couple will be directly proportioned to the mass flow rate.

Fluid to be measured is introduced into the loop 10 and flows in the direction indicated by the arrows. The flow of the fluid through the tubing in the manner indicated may be considered the equivalent of the spinning fly wheel of the conventional gyroscope; as a result, the rotation of the loop and its contents about the drive axis perpendicular to the axis of the coil 10 will produce a gyroscopic couple which will cause a displacement of the entire loop about an axis perpendicular to each of the two named axes as suggested in Fig. 3 by angle $\theta$.

To measure the resultant torque produced by the gyroscopic couple, a gimbal 44 is mounted on and rotates with the coil 10 about the drive axis. A pair of torque bars 46 carrying strain gauge 47 are disposed coaxially with the torque axis and interconnect the gimbal 44 and loop 10. Conductors are provided to interconnect the strain gauges to a slip ring assembly 48 to render a signal proportional to the twisting of the bars. Because the particular circuit per se forms no part of this invention, it is deemed unnecessary to describe it in detail. Suffice it to say that a simple circuit of this character is fully described in Electrical Resistance Strain Gauges, at page 18, by Dobie and Isaac, published by English University Press Ltd., London. For linearity the bars should be of the type which angularly deform an amount proportional to the torque applied thereto. The bellows 20 and 22 permit the displacement of the coil 10 about the torque axis without consuming an appreciable amount of the gyroscopic couple while the rest of the structure is supported against displacement about said axis by the mounting blocks 42.

An analysis of the effective portions of the loop or coil which will produce a displacement about the torque axis will aid in pointing out one of the most important advantages of this invention. Because the arms 16 and 18 rotate with and intersect the torque axis the forces created by the rotating mass of the arms and the fluid therein will substantially radiate from the torque axis and therefore will not effect a displacement of the loop. Therefore, the arms 16 and 18 may be considered inactive, for the fluid passing through them will not affect the response sensed by the torque bars 46. On the other hand, the force produced by the precession and fluid flow in legs 12 and 14 has a torque arm equal to the perpendicular distance from the legs to the torque axis. As a result, the fluid flow therein is effective in producing a gyroscopic couple which displaces the coil about the torque axis.

The importance of maintaining a constant effective radius was set forth in detail in the introductory paragraphs. As was therein indicated, the separation of the particles of a heterogeneous fluid under the influence of the centrifugal forces about the drive axis produces sizable errors when a loop of curved configuration is employed. Examination of the square embodiment illustrated reveals that appreciable separation will occur only in the arms 16 and 18 while negligible separation will occur in the legs 12 and 14. Because the arms 16 and 18 are substantially ineffective in producing a torque about the torque axis, separation in the arms will not render the meter inaccurate.

The above described configuration is seen to fulfill the requirements necessary to eliminate mixture sensitivity, i. e. it avoids the inaccuracies caused by the separation of heterogeneous fluids otherwise present in gyroscopic flowmeters. Moreover, the centrifugal unbalance is reduced to a minimum by limiting the angular displacement of the loop about the torque axis. The embodiment illustrated in Figs. 4 and 5 is a more complex configuration of a flowmeter which, in addition to eliminating the mixture sensitivity reduces the magnitude of the centrifugal torque to zero.

Proceeding now to a detailed description of the preferred embodiment of this invention shown in Figs. 4 and 5, inspection of the drawing reveals that a pair of rectangular turns of tubing 50 and 52 are disposed at right angles to one another with their intersections disposed along the line of the torque axis. An inlet conduit 70 is employed to direct fluid to be measured from the fluid line into the loop 50 through a bellows 72 while fluid is discharged through an outlet conduit 74 connected to the loop 52 by means of a bellows 76. The balance of the unit about the plane of drive and torque axes and the plane of the torque and gyroscopic axes is clearly illustrated in Fig. 4.

A motor 84 employed to rotate the coil formed by the loops 50 and 52 is connected by means of a belt 82 to a pulley 80 carried on the inlet conduit. To provide a means for connecting the rotating mass to a line carrying fluid to be measured, a pair of couplings 88 are mounted on the terminal portions of the inlet and outlet conduits.

From the description of the preceding embodiment of this invention it is clear that the arms 62 and 64 of loop 52 and the arms 66 and 68 of the loop 50 are ineffective in producing any torque about the torque axis under the influence of the rotating loops and the moving fluid therein. Only the legs 54, 56 and 58, 60 and the flowing fluid therein produce a couple to cause displacement of the flowmeter about the torque axis, and any inhomogeneity of fluid in those legs cannot change their effective lever arm about the torque axis by more than a small portion of the diameter of the tubing. Therefore, the separation of the particles of the heretofore difficult to measure heterogeneous fluid which occurs in the arms and to some extent in the legs of the coils will not substantially affect the accuracy of the instrument.

In operation, the meter is connected into a fluid line by means of the couplings 88. The fluid will flow through the instrument in the direction indicated by the arrows, namely, through the inlet conduit 70, the bellows 72, the arm 50, the leg 54, the arm and leg respectively designated by numerals 64 and 56, the arm 62, the leg and arm 60 and 68, the leg 58, the arm 66 and out through the bellows 76 and outlet conduit 74. The motor 84 will cause the loops 50 and 52 to rotate about the drive axis. A gimbal 78 carried by the inlet and outlet conduits rotates with the sensing element and carries a pair of torque bars 90 and 92 coaxially disposed on the torque axis, the bellows 72 and 76 which intersect the torque axis permit deflection of the loops under the influence of the gyroscopic couple.

The torque bars 90 and 92 are secured at their inner ends to the arms of the coils while their outer ends are mounted on the gimbal. Therefore, displacement of the meter will exert a twisting force on the inner ends of the bars and a pair of strain gauges 94 will deform in proportion to the torque exerted about torque axis. An electrical conductor 96 connected to the strain gauges, will carry a signal to the slip rings 98 mounted on the outlet conduit 74. The slip ring assembly and strain gauges will perform in a well known manner to provide a means for measuring the torque exerted on the bars by the displacement of the coil. Obviously a torsion spring or other torque measuring means may be used interchangeably with the torque bars without departing from the spirit of this invention.

It will be seen that the moments of inertia of the rotating mass remain balanced with all deflections of the sensing coil. Moreover, the meter obviously is not density sensitive because the flowing mass is symmetrically disposed about the torque axis so that the centrifugal forces produced will balance at all deflection angles. Tests have revealed that a flowmeter constructed in the manner illustrated will perform with substantially 100% accuracy.

The centrifugal balance of the sensing coils about the torque axis may best be demonstrated graphically. Fig. 6 is presented for that purpose. Clearly, when the sensing coil rotates about the drive axis in the position illustrated by the full lines in Fig. 6, the force couples produced about the torque axis by the rotation of the loop 50 about the drive axis will be equal and opposite to the force couple produced about the torque axis by the centrifugal force created by rotation of the loop 52 about the drive axis. This is so because the centers of mass of each half of each loop are equidistant from the drive axis and their distances from the torque axis are also equal. Stated mathematically, $FR=F_1R_1$.

When the sensing coil is displaced to the position shown in broken lines, however, the distance from the centers of mass of each of the half loops of coil 50 to the drive axis increases, resulting in an increase in the magnitude of their centrifugal forces $F_2$, while the distance from the centers of mass of each half of the loop 52 to the drive axis decreases, resulting in a proportionate decrease in the magnitude of their centrifugal force $F_3$. At the same time, the distance of the force components of loop 50 from the torque axis decreases, while an increase occurs in the distance of the force components of loop 52 to the torque axis. Simple mathematics will demonstrate, however, that the couple produced by forces $F_2$ and distances $R_2$ will be equal and opposite to the couple produced by the forces $F_3$ and distance $R_3$, for the respective increases in $F_2$ and decreases in $R_2$ will be equal to the decrease of $F_3$ and increases of $R_3$ respectively. Therefore, it may be seen that the centrifugal balance is maintained, and no centrifugal torque will be added to the total torque measured by the torque bars 90 and 92.

The embodiment of this invention illustrated in Figs. 7 and 8 is suitable for performing mass flow measurement only in specific applications. A pair of spaced-apart coils 102 and 104 are illustrated as lying in planes parallel to and on opposite sides of the plane formed by the torque and drive axes. Because the inertia of the rotating mass about the plane formed by torque and drive axes must be equal to the inertia of the mass about the plane formed by the torque and gyroscopic spin axes to obtain highly accurate mass flow measurement, it will be obvious that the distance between the two loops will be dictated by the density of the fluid being measured. If for example the configuration as illustrated provides a perfect balance when water is flowing through the loops, it will be necessary to increase the distance $d$ by some determinable amount to maintain the equality of the inertias about the two named planes when a lighter fluid is to be measured. Once the distance is determined and the meter is constructed in accordance with the calculated dimensions, it will render highly accurate mass flow measurements.

Fluid to be measured is introduced into the coils through an inlet conduit 130 which is connected to a bellows or other flexible passage 134 intersecting the torque axis. A conduit 128 which communicates with the bellows 134 carries the fluid into the coil 102 when it travels through an arm 101, a leg 106, an arm 112, a leg 108 and an arm 111 back to a point near where the fluid began to traverse the coil 102. A transverse length of tubing 122 interconnects the coil 102 with the second coil 104 and fluid introduced therein flows around the coil through its arm 118, leg 116, arm 120 and leg 114 back to the arm 118. A return conduit 124 directs the fluid from the second coil through a bellows 132 to the outlet conduit 126 which communicates with the conduit from whence the fluid was diverted to perform the mass flow measurements. A pulley 138 mounted on the inlet conduit 130 is driven by a motor 140 by means of the belt 138 to rotate the coils about the drive axis. Obviously the fluid in the arms 101, 111, 112, 118, and 120 which flows parallel to the drive axis cannot produce a torque about the torque axis, and any inhomogeneity of fluid in the legs of the sensing coils cannot change their respective effective lever arms about the torque axis by more than a small fraction of the diameter of the tubing. Therefore, although the centrifugal force created by rotation of the sensing coil about the drive axis will cause separation of the fluid particles in those arms, it will not introduce substantial errors into the mass flow measurements. Moreover, once having mathematically determined the required separation ($d$) of the loops 104 and 106 dictated by the fluid to be measured, centrifugal balance of the instrument will be obtained, and may be demonstrated graphically by an analysis similar to that shown in Fig. 6.

The illustrated means for measuring the torque exerted on the coils resulting from the gyroscopic couple is the same as shown and described in preceding embodiments. A gimbal 142 mounted on the inlet and outlet conduits rotates about the drive or precession axis. A pair of torque bars 144 which are connected to the cross arms 146 engaging the arms of each coil lie along the torque axis and will have a twisting force exerted thereon as a result of the displacement of the coil. The flexible tubing or bellows 132 and 134 permits the coil to deflect and exert the twisting forces on the bars. A strain gauge 148 is mounted on each of the torque bars and responds to their twisting in the customary manner. A conductor 150 connects the strain gauges to a slip ring assembly 152 conveniently located on outlet conduit 126 and thereby provides means for transposing to intelligence the response of the torque bars.

Although the flowmeter illustrated in Figs. 7 and 8 is density sensitive and, therefore, must be constructed with a specific application in mind, once having determined its required dimensions it performs most satisfactorily.

It will be noted that each of the embodiments has been described as rotating about the drive axis. Therefore, the signal obtained from the sensing element may be measured by direct current apparatus. However, it would not be a departure from the spirit of this invention to oscillate the coils to produce an alternating signal from the sensing elements.

It has been suggested above that if rotation of the coils about the drive axis is at a known predetermined angular velocity, the torque exerted on the sensing elements will be directly proportional to the mass flow rate, in slugs per second. The fact is made clear by an inspection of the governing formula for gyroscopic flowmeters a rectangular configuration wherein $T = C4R^2rW$ (where $C$ is the number of sensing coils, $R$ is the radius of a circumscribed circle intersecting the corners of the coils, and $r$ and $W$ are the precessional velocity and mass flow rate respectively), for obviously the factors $C$, $4$, $R$, $r$ will be known constants. However, because we are particularly concerned with highly accurate measurements, it is advantageous to dispense with synchronous motors, for their use makes the accuracy of the meter dependent on the line frequency. If non-synchronous drive means are used in conjunction with means for measuring the angular velocity of the coils about the drive axis, comparably accurate results may be obtained.

It is also important to note that the strain gauges used to measure the torque exerted on the torque bars may be replaced by any of numerous other devices, such as a dynamo transformer of the type disclosed in the patent to Mueller, No. 2,488,734 issued Nov. 22, 1949.

A word about meters employing configurations similar to those illustrated in the drawings. It is to be remembered that the meters shown have been invented particularly with the measurement of heterogeneous fluids in mind. Nonetheless, the requirements of centrifugal balance for a near perfect flowmeter set forth in the introductory paragraphs of the application apply equally to the measurement of homogeneous fluids.

Regardless of the shape of the coil employed in the sensing element, the centrifugal balance must be present to eliminate density sensitivity. For example if coils of circular or oval configuration are used in the measurement of the mass flow rate of homogeneous fluids, centrifugal balance must be present to acquire accurate results.

Therefore, a meter of any configuration having centrifugal balance is contemplated in the light of the teachings of this invention and clearly must be considered within the scope thereof.

Although specific elements have been recited as comprising the components of the flowmeters illustrated, numerous modifications and equivalent substitutions will readily occur to a man skilled in the art to which this invention pertains. Therefore, it is not our intention to be limited by the specific embodiments illustrated and described, but only by the appended claims.

What we claim as new and desire to secure by Letters Patent of the United States is:

1. A flowmeter comprising a conduit formed into at least a substantially rectangular coil having symmetry about a first axis, means including inlet and outlet passages and flexible couplings for directing through said conduit fluid to be measured, means for supporting said conduit for rotation about a second axis parallel to two sides of said rectangular coil and perpendicular to said first axis, drive means for rotating said conduit about said second axis, and means for measuring the gyroscopic couple tending to rotate said coil about a third axis perpendicular to said first and said second axes at their point of intersection, said gyroscopic couple being derived from the flow of fluid through said coil and the rotation of said coil about said second axis.

2. A flowmeter comprising a conduit formed into at least a substantially rectangular coil having symmetry about a first axis, means including inlet and outlet passages and flexible couplings for directing through said conduit fluid to be measured, means for supporting said conduit for rotation about a second axis perpendicular to said first axis, drive means for rotating said conduit about said second axis, and means for measuring the gyroscopic couple tending to rotate said coil about a third axis parallel to two sides of said rectangular coil and perpendicular to said first and said second axes at their point of intersection, said gyroscopic couple resulting from the passage of fluid through said coil and the rotation of said coil about said second axis.

3. A flowmeter as defined in claim 2 wherein said coil lies substantially in a plane normally including said second axis, but rotatable about said third axis.

4. A flowmeter as defined in claim 2 wherein said conduit is formed into a plurality of rectangular coils, each said coil lying in a plane, said planes intersecting at said third axis.

5. A flowmeter as defined in claim 2 wherein said conduit is formed into a pair of parallel rectangular coils symmetrical about said first axis and equally spaced from said second axis.

6. A flowmeter as defined in claim 1 wherein said conduit is formed into a single rectangular coil normally lying in a plane which includes said second axis.

7. A flowmeter as defined in claim 1 wherein said conduit is formed into a pair of parallel rectangular coils symmetrical about said first axis and equally spaced from said second axis.

8. A flowmeter comprising a conduit formed into at least a rectangular coil having symmetry about a first axis, means for supporting said coil for rotation about a second axis disposed at an angle to said first axis, drive means for rotating said coil about said second axis, inlet means for introducing fluid to be measured into said conduit, outlet means for removing said fluid from said conduit, said coil having arms forming two opposite sides thereof equally spaced from and in planes parallel to said second axis and having legs forming the remaining two opposite sides thereof, said legs being equally spaced from and parallel to a third axis, a gyroscopic couple resulting from the passage of fluid through said coil and the rotation of said coil, and means for measuring the magnitude of said couple about said third axis.

9. A flowmeter as defined in claim 8 wherein said measuring means includes a gimbal ring surrounding said coil, torque bars connecting said coil to said gimbal ring, said torque bars lying substantially on said third axis, and strain gauges mounted on said torque bars.

References Cited in the file of this patent

UNITED STATES PATENTS 2,624,198     Pearson _____ Jan. 6, 1953